United States Patent [19]

Gautreaux

[11] E Re. 29,488

[45] Reissued Dec. 6, 1977

[54] FUEL COMPOSITIONS AND ADDITIVE MIXTURES FOR ALLEVIATION OF EXHAUST GAS CATALYST PLUGGING

[75] Inventor: Marcelian F. Gautreaux, Baton Rouge, La.

[73] Assignee: Ethyl Corporation, Richmond, Va.

[21] Appl. No.: 728,398

[22] Filed: Sept. 30, 1976

Related U.S. Patent Documents

Reissue of:

[64] Patent No.: 3,926,580
Issued: Dec. 16, 1975
Appl. No.: 483,641
Filed: June 27, 1974

[51] Int. Cl.[2] ..... C10L 1/18
[52] U.S. Cl. ..... 44/68; 44/70
[58] Field of Search ..... 44/68, 70

[56] References Cited

U.S. PATENT DOCUMENTS

| | | | |
|---|---|---|---|
| 3,328,440 | 6/1967 | Shapiro et al. | 44/68 |
| 3,330,844 | 7/1967 | Kozikowski et al. | 44/68 |
| 3,442,631 | 5/1969 | Glucks'ein | 44/68 |
| 3,558,292 | 1/1971 | Abowd, Jr. | 44/68 |
| 3,808,131 | 4/1974 | Otto et al. | 44/68 |

*Primary Examiner*—Daniel E. Wyman
*Assistant Examiner*—Mrs. Y. Harris-Smith
*Attorney, Agent, or Firm*—Donald L. Johnson; Robert A. Linn; Willard G. Montgomery

[57] ABSTRACT

Gasoline compositions and additive mixtures of carboxymethoxysuccinic acid, its salts, esters, or other derivatives in amount sufficient to alleviate the plugging of certain catalysts being used in an engine exhaust system to lower the amount of undesirable constituents in exhaust gas from an engine being operated on gasoline containing a cyclopentadienyl manganese antiknock.

40 Claims, No Drawings

FUEL COMPOSITIONS AND ADDITIVE MIXTURES FOR ALLEVIATION OF EXHAUST GAS CATALYST PLUGGING

Matter enclosed in heavy brackets [ ] appears in the original patent but forms no part of this reissue specification; matter printed in italics indicates the additions made by reissue.

BACKGROUND OF THE INVENTION

Cyclopentadienyl manganense compounds are excellent antiknocks in gasoline used to operate internal combustion engines. These manganese compounds have proved to be especially beneficial in solving some of the problems present when low-lead or lead-free gasolines are used with internal combustion engines. Use of such compounds as antiknocks is described in U.S. Pat. Nos. 2,818,417; 2,839,552; and 3,127,351, incorporated herein by reference. Not only are these compounds effective antiknock compounds, but it has also been found that they do not adversely affect the activity of oxidation metal catalysts used to decrease the amount of undesirable constituents in engine exhaust gas. Under some operating conditions it has been found that, although the manganese antiknocks do not lessen the activity of the exhaust gas catalyst, they can interact in some manner at the surface of the catalyst bed leading to a reduction in the size of the openings into the bed thereby causing an increase in exhaust back-pressure and a decrease in the effective life of said catalysts. The present invention provides a simple effective means of alleviating this problem.

It has been previously suggested that the addition of triethyl citrate to gasoline mixes containing organomanganese antiknocks tends to reduce catalyst plugging. The use of triethyl citrate, however, has proved to be of rather limited success in reducing the plugging problem, especially at higher temperatures.

SUMMARY

According to the present invention, the useful life of an exhaust gas catalyst in an exhaust system of an engine operating on gasoline containing a cyclopentadienyl manganese antiknock is greatly increased by providing new additive fluids and gasoline compositions which contain an amount of carboxymethoxysuccinic acid or gasoline soluble derivative thereof sufficient to alleviate plugging of the exhaust gas catalyst.

DESCRIPTION OF THE PREFERRED EMBODIMENTS

The essence of the present invention resides in reducing the plugging of oxidation metal catalytic apparatus for purifying exhaust gases of internal combustion engines which burn a gasoline containing an organomanganese compound. This reduction in plugging is effected by the addition of carboxymethoxysuccinic acid, its gasoline soluble esters, salts, or other gasoline soluble derivatives to the gasoline. Accordingly, a preferred embodiment is a gasoline suitable for use in an internal combustion engine and containing an amount of organomanganese compound, preferably a cyclopentadienyl manganese tricarbonyl, sufficient to increase its antiknock effectiveness, and also containing an amount sufficient to prevent plugging of the catalyst of carboxymethoxysuccinic acid, or its gasoline soluble salts, esters, and other gasoline soluble derivatives.

A further embodiment of the present invention is a gasoline additive fluid composition comprising an organomanganese compound, preferably a cyclopentadienyl manganese tricarbonyl, and most preferably methylcyclopentadienyl manganese tricarbonyl, in an amount sufficient to improve the antiknock characteristics of the gasoline and carboxymethoxysuccinic acid, or its gasoline soluble salts, esters, and other gasoline soluble derivatives, preferably the mono-, di-, and triesters of carboxymethoxysuccinic acid, and most preferably the triesters of carboxymethoxysuccinic acid, in an amount sufficient to reduce catalyst plugging.

Since the invention also embodies the operation of an internal combustion engine in a manner which results in reduced plugging of the catalyst, a still further embodiment is a method of operating an internal combustion engine using a gasoline containing an organomanganese, preferably a cyclopentadienyl manganese tricarbonyl, and most preferably methylcyclopentadienyl manganese tricarbonyl antiknock in a manner which results in substantial reduction in the plugging of the catalyst, said method comprising (a) supplying to the fuel induction system of said engine a gasoline containing an organomanganese antiknock and a gasoline soluble solution of carboxymethoxysuccinic acid, its salts, esters, or other gasoline soluble derivatives, (b) mixing said gasoline with air, (c) inducting the mixture into the combustion chambers of said engine, (d) compressing said mixture, (e) igniting said compressed mixture, and (f) exhausting the resultant combustion products which have a reduced plugging effect on the catalyst, through said catalyst.

Liquid hydrocarbon fuels of the gasoline boiling range are mixtures of hydrocarbons having a boiling range of from about 80° F to about 430° F. Of course, these mixtures can contain individual constituents boiling above or below these figures. These hydrocarbon mixtures contain aromatic hydrocarbons, saturated hydrocarbons and olefinic hydrocarbons. The bulk of the hydrocarbon mixture is obtained by refining crude petroleum by either straight distillation or through the use of one of the many known refining processes, such as thermal cracking, catalytic cracking, catalytic hydroforming, catalytic reforming, and the like. Generally, the final gasoline is a blend of sticks obtained from several refinery processes. The final blend may also contain hydrocarbons made by other procedures such as alkylate made by the reaction of $C_4$ olefins and butanes using an acid catalyst such as sulfuric acid or hydrofluoric acid.

Preferred gasolines are those having a Research Octane Number of at least 85. A more preferred Research Octane Number is 90 or greater. It is also preferred to blend the gasoline such that it has a content of aromatic hydrocarbons ranging from 10 to about 60 volume percent, an olefinic hydrocarbon content ranging from 0 to about 30 volume percent, and a saturate hydrocarbon content ranging from about 40 to 80 volume percent, based on the whole gasoline.

In order to obtain fuels having properties required by modern automotive engines, a blending procedure is generally followed by selecting appropriate blending stocks and blending them in suitable proportions. The required octane level is most readily accomplished by employing aromatics (e.g., BTX, catalytic reformate or the like), alkylate (e.g., $C_{6-9}$ saturates made by reacting $C_4$ olefins with isobutane using a HF or $H_2SO_4$ catalyst), or blends of different types.

The balance of the whole fuel may be made up of other components such as other saturates, olefins, or the like. The olefins are generally formed by using such procedures as thermal cracking, catalytic cracking and polymerization. Dehydrogenation of paraffins to olefins can supplement the gaseous olefins occurring in the refinery to produce feed material for either polymerization or alkylation processes. The saturated gasoline components comprise paraffins and naphthenes. These saturates are obtained from (1) virgin gasoline by distillation (straight run gasoline), (2) alkylation processes (alkylates) and (3) isomerization procedures (conversion of normal paraffins to branched chain paraffins of greater octane quality). Saturated gasoline components also occur in so-called natural gasolines. In addition to the foregoing, thermally cracked stocks, catalytically cracked stocks and catalytic reformates contain saturated components.

The classification of gasoline components into aromatics, olefins and saturates is well recognized in the art. Procedures for analyzing gasolines and gasoline components for hydrocarbon composition have long been known and used. Commonly used today is the FIA analytical method involving fluorescent indicator adsorption techniques. These are based on selective adsorption of gasoline components on an activated silica gel column, the components being concentrated by hydrocarbon type in different parts of the column. Special fluorescent dyes are added to the test sample and are also selectively separated with the sample fraction to make the boundaries of the aromatics, olefins and saturates clearly visible under ultraviolet light. Further details concerning this method can be found in "1969 Book of ASTM Standards," Jan. 1969 Edition, under ASTM Test Designation D 1319-66T.

The motor gasolines used in formulating the improved fuels of this invention generally have initial boiling points ranging from about 80° to about 105° F. and final boiling points ranging from about 380° to about 430° F. as measured by the standard ASTM distillation procedure (ASTM D-86). Intermediate gasoline fractions boil away at temperatures within these extremes.

From the standpoint of minimizing atmospheric pollution to the greatest extent possible, it is best to keep the olefin content of the fuel as low as can be economically achieved as olefins reportedly give rise to smog-forming emissions, especially from improperly adjusted vehicular engines. Accordingly, in the preferred base stocks of this invention the olefin content will not exceed about 10 volume percent and the most particularly preferred fuels will not contain more than about 5 percent olefins. Table I illustrates the hydrocarbon type makeup of a number of particularly preferred fuels for use in this invention.

TABLE I

Hydrocarbon Blends of Particularly Preferred Base Fuels

| Fuel | Volume Percentage | | |
|---|---|---|---|
| | Aromatice | Olefins | Saturates |
| A | 35.0 | 2.0 | 63.0 |
| B | 40.0 | 1.5 | 58.5 |
| C | 20.0 | 2.5 | 77.5 |
| D | 33.5 | 1.0 | 65.5 |
| E | 36.5 | 2.5 | 61.0 |
| F | 43.5 | 1.5 | 55.0 |
| G | 49.5 | 2.5 | 48.0 |

It is also desirable to utilize base fuels having a low sulfur content as the oxides of sulfur tend to contribute an irritating and choking character to smog and other forms of atmospheric pollution. Therefore, to the extent it is economically feasible, the fuel will contain not more than about 0.1 weight percent of sulfur in the form of conventional sulfur-containing impurities. Fuels in which the sulfur content is no more than about 0.02 weight percent are especially preferred for use in this invention.

Normally the gasoline to which this invention is applied is lead-free or substantially lead-free, although small amounts of organolead additives usually employed to give fuels of improved performance quality such as tetraalkyllead antiknocks including tetramethyllead, tetraethyllead, physical or redistributed mixtures of tetramethyllead and tetraethyllead, and the like may be present therein. The gasoline may also contain antiknock quantities of other agents such as cyclopentadienyl nickel nitrosyl, N-methyl aniline, and the like. Antiknock promoters such as tert-butyl acetate may be included. The gasoline may also contain blending agents or supplements such as methanol, isopropanol, t-butanol, and the like. Antioxidants such as 2,6-di-tert-butylphenol, 2,6-di-tert-butyl-p-cresol, phenylenediamines such as N,N'-di-sec-butyl-p-phenylenediamine, N-isopropylphenylenediamine, and the like, may be present. Likewise, the gasoline can contain dyes, metal deactivators, or other types of additives recognized to serve some useful purpose in improving the gasoline quality.

Cyclopentadienyl manganese tricarbonyls are known antiknocks and their preparation and use are described in U.S. Pat. Nos. 2,818,417; 2,839,552; and 3,127,351. An important antiknock of this type is methylcyclopentadienyl manganese tricarbonyl. The amount of the cyclopentadienyl manganese tricarbonyl added to the gasoline should be an amount adequate to increase its antiknock effectiveness. This has generally been found to be in the range of from about 0.005 to 10 grams per gallon of manganese as a cyclopentadienyl manganese tricarbonyl. A preferred range is from about 0.05 to 6 gm (grams) of manganese per gallon as a cyclopentadienyl manganese tricarbonyl. A more preferred range is from about 0.05 to about 0.25 grams of manganese per gallon, and a most preferred range is from about 0.05 to about 0.125 grams of manganese per gallon as methylcyclopentadienyl manganese tricarbonyl.

The exhaust gas purification apparatus are well known and generally employ an oxidation catalytic metal such as platinum, rhodium, palladium, or iridium or combinations thereof. Some examples of catalytic converter units are described in U.S. Pat. Nos. 3,441,381 and 3,692,497. The essential elements of such units consist of a catalytic reactor formed by an enlarged cylindrical-frustoconical housing having an inlet port and an outlet port. Located within the housing is a catalyst bed which is a honeycomb alumina-magnesia-silica monolithic ceramic-supported platinum catalyst.

In order to obtain rapid warmup required for catalyst activation, the catalytic reactor is preferably located proximate to the engine exhaust outlet. By proximate is meant that it is close enough that the catalyst bed is rapidly heated to "light off" or activation temperature. The exhaust gas temperature required to accomplish this is dependent upon the nature of the catalyst. Noble metal catalysts containing at least some noble metal such as platinum, palladium or mixtures thereof, activate at lower exhaust temperatures, e.g., 350°-500° F. However, in order to ensure activation, the catalytic reactor is preferably located such that the inlet exhaust temperature is above about 1,000° F. and more preferably above about 1,400° F. during normal engine cruise conditions. It is also at temperatures above about 1,400° F. and at concentrations of manganese of and above 0.25 gms per gallon that the cyclopentadienyl manganese antiknocks are most likely to plug the catalyst and, hence, it is under these conditions that the present invention is most useful. With concentrations of manganese of less than 0.25 gms per gallon and at temperatures under 1,400° F. plugging of the catalyst does not occur.

In tests run with the aforementioned catalytic converters containing monolithic ceramic supports it has been found that plugging occurs by "spikes" forming on the entrance surface of the cordierite ceramic. These form a network which essentially traps large manganese particles and caps the entrance to the monolithic core.

As stated above, the exhaust gas catalyst unit uses a honeycomb, monolithic ceramic, supported platinum catalyst. These are made by coating a corrugated ceramic structure with an activated alumina and a [palladium] *platinum* compound. The preferred ceramics are made using alumina-silica, magnesia-alumina-silica (e.g., cordierite) or mixtures thereof. Palladium can be used in place of platinum, and since these elements generally occur in nature together, it is sometimes preferred to use mixtures of platinum and palladium.

The utility of the invention in alleviating plugging with noble metal catalysts suggests its use with other catalysts if an undesirable amount of plugging is noted. Many non-noble metals have been suggested for exhaust gas catalysts. Examples of other catalytic metals include V, Cr, Mn, Fe, Co, Ni, Cu, Zn, Zr, Na, Mo, Ru, Rh, Ag, W, Re, Os, Ir, Pb, Ba, and the like. These are generally used in an oxide form. They may be used individually or in various groupings such as Cu-Cr, Cu-Cr-V, Cu-Pd, Mn-Pd, Ni-Cr and the like. They may be supported on the above monolithic ceramic support or on any other of numerous well-known catalyst supports such as granular, pelletized, or extruded alumina, silica, silica-alumina, zirconia, magnesia, alumina-magnesia and the like.

The antiplugging agents of the present invention have the general formula

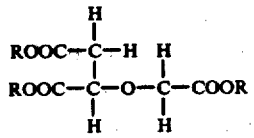

wherein R is independently selected from hydrogen, metals, ammonium and substituted ammonium cations, hydrocarbyl radicals of preferably up to 20 carbon atoms, and substituted hydrocarbyl radicals. For purposes of this invention a hydrocarbyl radical can be defined as an organic group solely composed of hydrogen and carbon atoms. Some non-limiting representative examples of hydrocarbyl radicals are alkyl, cycloalkyl, alkenyl, aralkyl, alkaryl, and aryl.

Examples of alkyl groups represented by the R group in the above general formula are methyl, ethyl, n-propyl, isopropyl, n-butyl, isobutyl, sec-butyl, tert-butyl, n-amyl, and the various positional isomers thereof, and likewise the corresponding straight and branched chain isomers of hexyl, heptyl, octyl, nonyl, decyl, undecyl, dodecyl, and the like.

When said R groups are cycloalkyl groups, they may be cyclopropyl, cyclobutyl, cyclopentyl, cyclohexyl, cycloheptyl, cyclooctyl, cyclononyl, cyclodecyl, cycloundecyl, cyclododecyl, and the like. They may also be such cycloaliphatic groups as α-cyclopropyl-ethyl, α-cyclobutyl-propyl, β-cyclobutyl-propyl, and similar alkyl derivatives of the higher cycloalkyls.

The R groups in the above general formula may also be alkenyl groups such as ethenyl, 1-propenyl, 2-propenyl, isopropenyl, 1-butenyl, 2-butenyl, 3-butenyl, and the corresponding branched-chain isomers thereof as for example, 1-isobutenyl, 2-isobutenyl, 2-sec-butenyl, including 1-methylene-2-propenyl, and the various isomers of pentenyl, hexenyl, heptenyl, octenyl, nonenyl, decenyl, undecenyl, and dodecenyl, including 3,3-dimethyl-1-butenyl, 2,3-dimethyl-1-butenyl, 2,3-dimethyl-2-butenyl, 2,3-dimethyl-3-butenyl, 1-methyl-1-ethyl-2-propenyl, and the like.

When said R groups are alkaryl groups, they may be tolyl, 2,3-xylyl, 2,4-xylyl, 2,5-xylyl, 2,6-xylyl, 3,4-xylyl, 3,5-xylyl; o, m, and p-cumenyl, mesityl, o, m, and p-ethylphenyl, 2-methyl-1-naphthyl, 3-methyl-1-naphthyl, 4-methyl-1-naphthyl, 5-methyl-2-naphthyl, 6-methyl-3-naphthyl, 7-methyl-1-naphthyl, 8-methyl-4-naphthyl, 1-ethyl-2-naphthyl, and its various positional isomers and the like.

Examples of aryl groups which may be present in the above general formula are phenyl, naphthyl, and the like.

When said R groups are aralkyl groups, they may be benzyl, phenylethyl, 1-phenylpropyl, 2-phenylpropyl, 3-phenyl-propyl, 1- and 2-isomers of phenylisopropyl, 1-, 2-, and 3-isomers of phenylbutyl, and the like.

The substituted hydrocarbyl radicals are hydrocarbyl radicals which contain substituents such as halogen, hydroxyl, carboxyl, alkoxycarbonyl, amino, or amide radicals. Thus, the three R groups may contain the same or different substituents or any one R group may contain one or more of said radicals substituted thereon.

As mentioned above, the R groups may be halogen substituted. Thus, chlorine, bromine, iodine, and fluorine may be substituted on the alkyl, cycloalkyl, alkenyl, alkaryl, aryl, and aralkyl groups which are present. Non-limiting examples of such substituted groups are chloromethyl, chloroethyl, bromoethyl, 2-fluoro-1,2-dibromoethyl, 1-iodopropyl, 2-fluoropropyl, 1-chlorobutyl, 2-bromobutyl, 2-iodo-2-methylpropyl, 1-chloropentyl, 3-fluoro-2-methylbutyl, 3-iodo-2-methylbutyl, 1-chloro-2,2-dimethylpropyl, 2-chloroheptyl, 3-fluorononyl, 1-chlorododecyl, and the like. Examples of halogenated cycloalkyl groups are chlorocyclopropyl, chlorocyclohexyl, 1,2-dichlorohexyl, bromocyclobutyl, iodocyclohexyl, and the like.

Examples of halogen-substituted alkenyl groups are bromoethenyl, chloroethenyl, iodoethenyl, 1-bromododecenyl, and the like.

Examples of halogenated alkaryl groups are chloro-o-tolyl, chloro-p-tolyl, chloro-m-tolyl, 2-bromo-3,4-xylyl, 4-bromo-2,3-xylyl, 5-bromo-2,4xylyl, 2-bromo-4,5-xylyl, o, m, and p-tolyl, 3-bromomesityl, chloro(methyl)-1-naphthyl, iodo(ethyl)-1-naphthyl, all positional isomers of the above, and the like.

Examples of halogen substituted aryl groups are bromophenyl, 2-bromo-1-naphthyl, 3-bromo-1-naphthyl and all positional isomers thereof, 2,4-dibromophenyl, 2,3-dibromophenyl, 2,5-dibromophenyl, 2,3,4,5-tetrabromophenyl, 2,3,5,6-tetrabromophenyl, pentabromophenyl, all isomers of chlorophenyl, and all isomers of multichlorophenyl: 2-chloro-1-naphthyl and the remaining isomers thereof: 2,3-dichloro-1-naphthyl, 2,4-dichloro-1-naphthyl and the remaining positional isomers of dichloronaphthyl,2,3,4,5-tetrachloro-1-naphthyl.

Amine groups may also be substituted on the R groups. Some non-limiting illustrative examples of R groups containing amine substituents are aminomethyl, 2-aminoethyl, 2,2-diaminoethyl, 2-aminoisopropyl, 5-aminopentyl, 1,2-aminododecyl, 1,2-diaminoethyl, 1,5-diaminopentyl, aminocyclobutyl, aminocyclohexyl, 3-amino-1-propen-1-yl, 5-amino-2-penten-1-yl, aminophenyl, (methylamino)phenyl, 2-amino-o-tolyl, 4-amino-m-tolyl, 3-amino-p-tolyl, and other positional isomers, various isomers of diaminophenyl, amino-2,5-xylyl, and various positional isomers thereof, 2-amino-1-naphthyl, 3-amino-1-naphthyl, 2-amino-3-methyl-1-naphthyl, 2,3-diamino-5-ethyl-1-naphthyl, and the like.

The R groups may contain amide groups which may be illustrated by such non-limiting examples as: carbamoylmethyl, 2-carbamoylethyl, 4-carbamoylbutyl, 8-carbamoyl-2-ethyloctyl, 1,4-dicarbamoylbutyl, carbamoylcyclopentyl, carbamoylcyclohexyl, 2-carbamoyl-o-tolyl, 2-carbamoyl-m-tolyl, 3-carbamoyl-p-tolyl, (carbamoylmethyl)phenyl, (2-carbamoylethyl)benzyl; o, m, and p-(2-carbamoylethyl)phenyl, and the like.

The preferred hydrocarbyls are the alkyls, especially the lower alkyls having from 1 to about 10 carbon atoms, with the more preferred alkyls being ethyl and methyl. The most preferred alkyl is ethyl.

The R groups in the above general formula may also be ammonium and substituted ammonium cations such as morpholinium, alkyl ammonium and mono-, di-, and trialkanol ammonium. Typical of such materials are triammonium carboxymethoxysuccinate, the normal monoethanolamine salt of carboxymethoxysuccinic acid, the normal diethanolamine salt of carboxymethoxysuccinic acid, the normal triethanolamine salt of carboxymethoxysuccinic acid, the nornal tetramethylammonium salt of carboxymethoxysuccinic acid, tri(ethylammonium)carboxymethoxysuccinate, the normal monoisopropanolamine salt of carboxymethoxysuccinic acid, the normal diisopropanolamine salt of carboxymethoxysuccinic acid, the normal morpholine salt of carboxymethoxysuccinic acid and the like.

Corresponding esters wherein from 1 to 2 of the ammonium and/or substituted ammonium cations are replaced with organic groups also have effective plugging reducing properties when used with a cyclopentadienyl manganese tricarbonyl containing gasoline. Typical organic groups include the above hydrocarbyl and substituted hydrocarbyl groups.

Some examples of metals represented by the R groups are the monovalent and polyvalent metals, particularly the alkali metals, and especially sodium, potassium, and lithium. Useful metal salts are trisodiumcarboxymethoxysuccinate, tripotassiumcarboxymethoxysuccinate, and trilithiumcarboxymethoxysuccinate. Additional useful metal salts are disodiumcarboxymethoxysuccinate, monosodiumcarboxymethoxysuccinate, dipotassiumcarboxymethoxysuccinate, monopotassiumcarboxysuccinate, dilithiumcarboxymethoxysuccinate, monolithiumcarboxymethoxysuccinate, monosodiumdipotassiumcarboxymethoxysuccinate, disodiummonopotassiumcarboxymethoxysuccinate, and the like.

Corresponding esters wherein from 1 to 3 of the metal atoms are replaced with organic groups are also useful antiplugging agents. It is understood that in the case of mono esters the remaining two R groups can both be metal cations, one of the R groups can be a metal cation and one of the R group can be hydrogen, both of the R groups can be hydrogen, both of the R groups can be ammonium or ammonium cations, one of the R groups can be an ammonium or substituted ammonium cation and the other R group can be hydrogen, or one of the R groups can be a metal cation and the other R group can be ammonium or a substituted ammonium cation. In the case of diesters the remaining R can be either a metal cation, ammonium or a substituted ammonium cation, or hydrogen. Typical organic groups are the aforementioned hydrocarbyl and substituted hydrocarbyl groups. The preferred esters are the mono-, di-, and trialkyl groups. The more preferred esters are the trialkyl esters of carboxymethoxysuccinic acid such as the triethyl, tributyl, trioctyl, tridecyl and tridodecyl esters or mixtures of two or more such esters, with the most preferred esters being triethylmethoxysuccinate.

In order to be most advantageously employed as antiplugging agents, the above compounds should be readily soluble, either directly or indirectly, in the gasoline. The carboxymethoxysuccinic acid, while not readily directly soluble in the gasoline is soluble in an alcohol such as ethyl alcohol and this resulting solution is then readily soluble in gasoline. The salts of carboxymethoxysuccinic acid, such as the ammonium salts and the salts of mono- and polyvalent metals, and particularly the salts of the alkali metals, especially the mono-, di-, and trilithium salts; the mono-, di-, and trisodium salts; and the mono-, di-, or tripotassium salts, are not very readily soluble in gasoline. Thus, some difficulty is encountered in incorporating these salts in effective quantities into gasoline to function as antiplugging agents. Other various aforementioned derivatives of carboxymethoxysuccinic acid are effective in reducing plugging of the catalyst by various degrees. The main requirement for these derivatives is that they be directly or indirectly soluble in the gasoline in useful concentrations.

The salts and esters of carboxymethoxysuccinic acid are known compounds whose preparation [is known] *has been described* in the art. The trisodium salt of carboxymethoxysuccinic acid, or trisodiumcarboxymethoxysuccinate [is], *can be* prepared as follows:

EXAMPLE 1

Maleic anhydride (0.2 mole; 19.6 g) is dissolved in water (100 ml) at room temperature and stirred for 10–15 minutes to convert it to the acid. Glycolic acid (0.24 mole; 18.3 g) is then added and dissolved with stirring. Calcium hydroxide (Ca 0.36 mole; 27 g) sufficient to attain a pH of 11.4 as measured initially at 25° C. is next added while stirring the reaction mixture vigorously. The mixture is heated to reflux and maintained at reflux for two hours while stirring vigorously. After cooling to 60° C., finely ground sodium carbonate (0.4 mole; 42.4 g) is added and stirring continued for 15 minutes at 60° C. The mixture is then cooled to room temperature and the suspended $CaCO_3$ filtered off and washed with water. The filtrate (including the washings) contains the product, trisodiumcarboxymethoxysuccinate in yields of about 95%.

EXAMPLE 2

The reaction mixture, trisodiumcarboxymethoxysuccinate, of Example 1, is converted to carboxymethoxysuccinic acid by neutralization with sulfuric acid.

[One method of preparing the triethyl ester of carboxymethoxysuccinic acid is set forth in Example 3 below.]

[EXAMPLE 3]

[Ethyl iodoacetate was reacted with L-maleic acid diethylester in the presence of sodium to give the triethyl ester of carboxymethoxysuccinic acid; Canadian Journal of Chemistry, pp. 316–317, Vol. 35, 1957.]

[Another] *One* method of preparing triethylcarboxymethoxysuccinate is according to the equation

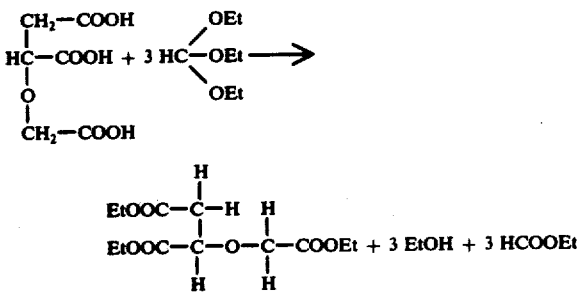

and is set forth below.

EXAMPLE [4] *3*

To 700 grams of carboxymethoxysuccinic acid in a reaction flask [were] *is* added 3,000 grams of triethylorthoformate. The mixture [was] *is* stirred and heated to [about 40°–50° C. The] *distill off* volatiles [were distilled off from the reaction vessel]. Heating [was] *is* continued for about 30 hours, at which time no more volatiles [were] *are* given off. The product, triethylcarboxymethoxysuccinate, [was] *is* removed and weighed. [The weight of the ester obtained was 476 grams.]

Tests were run to illustrate the unusual and beneficial effects of the products of this invention on reducing exhaust catalyst plugging with manganese. In such tests a single cylinder engine was used. The A/F mixture was held at approximately 16.0:1 maintaining 1.8% oxygen in the exhaust stream. The engine speed was run generally with a wide open throttle with the spark firing at an appropriate crank angle, depending on engine characteristics and exhaust gas temperature required.

Generally an exhaust gas temperature range of from 1,500° F. to 1,700° F. in the catalyst entrance cone was maintained.

The exhaust catalysts used were PTX units manufactured and sold by Engelhard Industries. The particular PTX unit used was the PTX-3 which is composed of a cordierite ceramic core which has a random stacked, 16 cell/inch configuration. The ceramic has 0.2 wt. percent platinum with 0.5 g Pt on the entire ceramic core of the PTX-3 unit. This ceramic is 2.625 inches in diameter, 3.8 inches long and is encased in a Monel mesh to take care of thermal expansion differences between the ceramic and steel housing. This is encased in a stainless steel housing 3 inches in outer diameter and 4 inches long. The ceramic is held firmly in place by two retaining rings on the face of the ceramic welded to the steel casing; in addition ⅛ inch square strips are welded to the casing to prevent rotation of the core. The inlet and outlet cover of the unit are 1.5 inches long and the sides form a 45° angle. The casings are joined to a pipe which is connected to the exhaust system. A standard unleaded gasoline of the type described above was used with from 0.25 to 1.0 g Mn/gal. The concentration of triethyl ester added to the gasoline ranged from 0.2 g/gal to 1.0 g/gal. To determine when the PTX-3 unit was plugged the back pressure in the exhaust stream in front of the PTX-3 unit was measured at predetermined intervals, usually every one or two hours, as the test progressed. The initial back pressure readings generally varied from 0.2 to 0.6 psi. When the back pressure reached a value of 2.0 psi the system was considered plugged and the test was terminated.

The following results were obtained in the above tests when triethylcarboxymethoxysuccinate and methylcyclopentadienyl manganese tricarbonyl were used in the test fuel.

TABLE II

| Temp. | Mn conc. | Triethyl ester of carboxymethoxysuccinic acid conc. | Hours to plug |
|---|---|---|---|
| 1500° F. | 1g/gal | 0 | 46–63 |
| | 1g/gal | 0.2g/gal | 193–219 |
| 1600° F. | 1g/gal | 0 | 30–43 |
| | 1g/gal | 0.2g/gal | 38 |
| | 1g/gal | 0.5g/gal | 55 |
| | 1g/gal | 1.0g/gal | 154 |
| 1700° F. | .25g/gal | 0 | 61–95 |
| | .25g/gal | .25g/gal | 159–50 percent plugged |

When trimethylcarboxymethoxysuccinate and methylcyclopentadienyl manganese were used in the test fuel the following results were obtained.

TABLE III

| Temp. | Mn conc. | Trimethyl ester of carboxymethoxysuccinic acid conc. |
|---|---|---|
| 1600° F. | 1g/gal | 1g/gal |

The catalyst life (time to plug the catalyst) was extended about 50 percent.

As demonstrated by the data in Tables II and III when the triesters of carboxymethoxysuccinic acid of the type described above are blended with gasoline containing cyclopentadienyl manganese antiknocks unexpected results are obtained in the alleviation of catalyst plugging.

The amount of antiplugging compound, as for example, triethylcarboxymethoxysuccinate, sufficient to reduce the plugging of the catalyst is at least to some extent dependent upon the amount of manganese present in the gasoline and on the inlet exhaust temperature. Generally, the greater the concentration of manganese and the higher the temperature the greater the amount of antiplugging compound needed to reduce plugging of the catalyst. Thus, for example, 0.2 gram of triethylcarboxymethoxysuccinate per gallon of gasoline is sufficient to extend the life of the catalyst from about 50 hours to about 200 hours at a temperature of 1,500° F. with unleaded gasoline containing 1 gram of manganese per gallon of gasoline. However, with the same concentration of manganese, but at a temperature of 1,600° F., 1 g/gal of triethylcarboxymethoxysuccinate is needed to effectively reduce plugging of the catalyst.

The lower limit at which the antiplugging compounds of the present invention, such as the triethyl esters of carboxymethoxysuccinic acid, are effective to reduce plugging is about 0.01 g/gal. Preferably, the amount of the compound is greater than 0.03 g/gal, and more preferably greater than 0.125 g/gal. There is no real upper limit on the concentration of the antiplugging compound, and, accordingly, the upper limit is restricted by such secondary considerations as economics, etc. However, 1.0 g/gal of the antiplugging compounds, such as the triethyl ester of carboxymethoxysuccinic acid, is sufficient to reduce plugging of the catalyst when using a gasoline containing 1 g/gal of manganese at a temperature of 1,700° F. Thus, since the amount of the antiplugging compound, such as the aforementioned triethyl ester, is quite dependent upon the concentration of the manganese, for practical purposes the upper limit is about 10 g/gal.

It is convenient to utilize additive fluid mixtures composed of cyclopentadienyl manganese tricarbonyl antiknock agents and antiplugging agents having the general formula

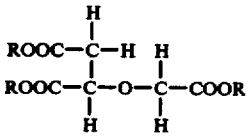

wherein R is independently selected from hydrogen, metals, ammonium and substituted ammonium cation, hydrocarbyl radicals, and substituted hydrocarbyl radicals. These additive fluid mixtures are added to lowlead or unleaded gasoline. In other words, part of the present invention are antiknock-antiplug fluids which comprise cyclopentadienyl manganese tricarbonyl antiknock agents and the antiplugging agents of the type described hereinabove.

Use of such antiknock-antiplug fluid in addition to resulting in great convenience in storage, handling, transportation, blending with fuels, and so forth, also are potent concentrates which serve the multipurpose functions of being useful as antiknocks, and catalyst plugging reducers.

In these fluid compositions the weight ratio of manganese-to-antiplugging agent can vary from about 0.03 gram of antiplugging agent such as triethylcarboxymethoxysuccinate to 1 gram of manganese or even 0.01 gram of the antiplugging agent such as triethylcarboxymethoxysuccinate to 1 gram of manganese on the one hand to about 10 grams of the antiplugging agent such as triethylcarboxymethoxysuccinate to about 1 gram of manganese on the other hand. Some examples of preferred fluids are 0.03 grams of triethylcarboxymethoxysuccinate to 0.125 grams of manganese, 0.06 grams of triethylcarboxymethoxysuccinate to 0.125 gram of manganese, 0.2 gram of triethylcarboxymethoxysuccinate to 1 gram of manganese, 0.1 gram of triethylcarboxymethoxysuccinate to 0.25 gram of manganese, 0.5 gram of triethylcarboxymethoxysuccinate to 1 gram of manganese, 1 gram of triethylcarboxymethoxysuccinate to 1 gram of manganese, 1 gram of trimethylcarboxymethoxysuccinate to 1 gram of manganese, and 2 grams of triethylcarboxymethoxysuccinate to 1 gram of manganese. The fluids may optionally contain other additives such as antioxidants, antirust agents, detergents, etc., as well as solvents, e.g., a hydrocarbon, to facilitate handling.

Although the preferred antiplugging compounds have the general formula

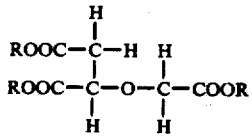

wherein R has been previously described, it is believed that compounds having the skeletal structure

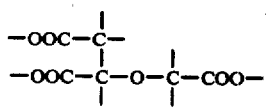

will have useful properties in reducing the plugging of exhaust catalysts.

Thus for example, one, some, or all of the carbon hydrogens can be replaced by other groups such as alkyls, cycloalkyls, aryls, aralkyls, and alkaryls. Furthermore, said carbon hydrogens may be substituted by halogen, hydroxyl, carboxyl, and amino radicals. A limiting factor regarding the numbers and types of group that can replace the carbon hydrogens is that these groups do not make the compound insoluble in gasoline to such a degree that an effective amount of compound cannot be added.

Although the compounds of the present invention have the most utility when added to gasoline, they can also be used in conjunction with other liquid petroleum distillate fuels such as kerosene, diesel fuel, jet engine fuel, and the like.

Claims to the invention follow.

I claim:

1. As a composition of matter, a gasoline for an internal combustion engine comprising i. about 0.005 -10 grams of manganese per gallon as a cyclopentadienyl manganese tricarbonyl wherein said cyclopentadienyl group is a hydrocarbon group containing 5-17 carbon atoms, and ii. amount sufficient to reduce the plugging of an exhaust gas catalyst of a compound having the general formula:

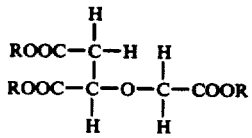

wherein R is independently selected from hydrogen and hydrocarbyl radicals.

2. The composition of claim 1 wherein R is a lower alkyl group having from 1 to about 10 carbon atoms.

3. The composition of claim 1 wherein each R is methyl.

4. The composition of claim 1 wherein each R is ethyl.

5. The composition of claim 1 wherein said cyclopentadienyl manganese tricarbonyl is methylcyclopentadienyl manganese tricarbonyl.

6. Gasoline comprising i. a cyclopentadienyl manganese tricarbonyl wherein said cyclopentadienyl group is a hydrocarbon group containing 5-17 carbon atoms antiknock compound in an amount sufficient to improve the antiknock characteristics of said gasoline, and ii. a compound in an amount sufficient to reduce the plugging of a noble metal exhaust gas catalyst, said compound having the general formula:

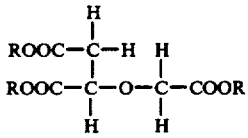

wherein R is independently selected from hydrogen and a hydrocarbyl radical.

7. The gasoline of claim 6 wherein R is a lower alkyl group having from 1 to about 10 carbon atoms.

8. The gasoline of claim 6 wherein each R is methyl.

9. The gasoline of claim 6 wherein each R is ethyl.

10. The gasoline of claim 6 wherein R is an aryl group.

11. The gasoline of claim 10 wherein said aryl group is a phenyl group of up to 10 carbon atoms.

12. A substantially lead-free gasoline (for use with a noble metal exhaust gas purification catalyst, said gasoline comprising i. a cyclopentadienyl manganese tricarbonyl wherein said cyclopentadienyl group is a hydrocarbon group containing 5-17 carbon atoms antiknock in an amount sufficient to improve the antiknock characteristics of said gasoline, and ii. a compound in an amount sufficient to reduce plugging of said noble metal exhaust gas purification catalyst, said compound having the general formula:

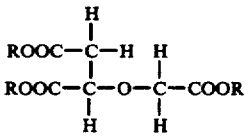

wherein R is independently selected from hydrogen and hydrocarbyl radicals.

13. The gasoline of claim 12 wherein R is a lower alkyl group having from 1 to about 10 carbon atoms.

14. The gasoline of claim 12 wherein each R is methyl.

15. The gasoline of claim 12 wherein each R is ethyl.

16. The gasoline of claim 12 wherein said hydrocarbyl radical is an aryl group.

17. The gasoline of claim 16 wherein said aryl group is a phenyl group of up to about 10 carbon atoms.

18. A gasoline for use with a noble metal exhaust gas purification catalyst said gasoline comprising i. a cyclopentadienyl manganese tricarbonyl wherein said cyclopentadienyl group is a hydrocarbon group containing 5-17 carbon atoms antiknock in an amount sufficient to improve the antiknock characteristics of said gasoline, and ii. a compound in an amount sufficient to reduce the plugging of said noble metal exhaust gas catalyst, said compound having the formula:

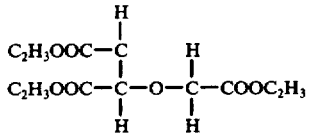

19. As a composition of matter an additive fluid for low lead or essentially lead-free gasoline comprising a cyclopentadienyl manganese tricarbonyl wherein said cyclopentadienyl group is a hydrocarbon group containing 5-17 carbon atoms antiknock, and an amount sufficient to reduce the plugging of an exhaust gas catalyst of a compound having the general formula:

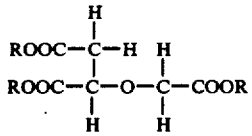

wherein R is independently selected from hydrogen and hydrocarbyl radicals.

20. The composition of claim 19 wherein R is a lower alkyl group having from 1 to about 10 carbon atoms.

21. The composition of claim 19 wherein each R is methyl.

22. The composition of claim 19 wherein each R is ethyl.

23. The composition of claim 19 wherein R is an aryl group.

24. The composition of claim 23 wherein said aryl group is a phenyl group of up to about 10 carbon atoms.

25. The composition of claim 19 wherein said cyclopentadienyl manganese tricarbonyl is methylcyclopentadienyl manganese tricarbonyl.

26. The composition of claim 25 wherein R is a lower alkyl group having from 1 to about 10 carbon atoms.

27. The composition of claim 26 wherein said lower alkyl group is ethyl.

28. The composition of claim 26 wherein said lower alkyl group is methyl.

29. The gasoline of claim 18 wherein said cyclopentadienyl manganese tricarbonyl is methylcyclopentadienyl manganese tricarbonyl.

30. The gasoline of claim 12 wherein said cyclopentadienyl manganese tricarbonyl is methylcyclopentadienyl manganese tricarbonyl.

31. The gasoline of claim 30 wherein R is a lower alkyl group having from 1 to about 10 carbon atoms.

32. The gasoline of claim 31 wherein said lower alkyl group is methyl.

33. The gasoline of claim 31 wherein said lower alkyl group is ethyl.

34. The gasoline of claim 6 wherein said cyclopentadienyl manganese tricarbonyl is methylcyclopentadienyl manganese tricarbonyl.

35. The gasoline of claim 34 wherein R is a lower alkyl group having from 1 to about 10 carbon atoms.

36. The gasoline of claim 35 wherein sid lower alkyl group is methyl.

37. The gasoline of claim 35 wherein said lower alkyl group is ethyl.

38. The composition of claim 5 wherein R is a lower alkyl group having from 1 to about 10 carbon atoms.

39. The composition of claim 38 wherein said lower alkyl group is ethyl.

40. The composition of claim 38 wherein said lower alkyl group is methyl.

* * * * *